US 9,258,587 B2

(12) United States Patent
Reddy et al.

(10) Patent No.: US 9,258,587 B2
(45) Date of Patent: Feb. 9, 2016

(54) CONTENT BLACKOUT DETERMINATIONS FOR PLAYBACK OF VIDEO STREAMS ON PORTABLE DEVICES

(75) Inventors: Sachinder D. Reddy, Allen, TX (US); Enrique Ruiz-Velasco, Flower Mound, TX (US); Laxmi Arte, Austin, TX (US); Bradley D. Beaver, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 212 days.

(21) Appl. No.: 12/984,781

(22) Filed: Jan. 5, 2011

(65) Prior Publication Data

US 2012/0174150 A1 Jul. 5, 2012

(51) Int. Cl.
*H04N 7/167* (2011.01)
*H04N 21/258* (2011.01)
*H04N 21/414* (2011.01)
*H04N 21/6334* (2011.01)

(52) U.S. Cl.
CPC ... *H04N 21/25841* (2013.01); *H04N 21/41407* (2013.01); *H04N 21/63345* (2013.01)

(58) Field of Classification Search
USPC .......................................................... 725/31
See application file for complete search history.

(56) References Cited

U.S. PATENT DOCUMENTS

| | | | | |
|---|---|---|---|---|
| 5,910,987 A * | 6/1999 | Ginter et al. | ..................... | 705/52 |
| 6,851,055 B1 * | 2/2005 | Boyle et al. | ..................... | 713/193 |
| 8,688,991 B1 * | 4/2014 | Sunil | ............................. | 713/176 |
| 8,745,388 B2 * | 6/2014 | Kanungo | ...................... | 713/168 |
| 2002/0082997 A1 * | 6/2002 | Kobata et al. | .................... | 705/51 |
| 2003/0145329 A1 * | 7/2003 | Candelore | ........................ | 725/87 |
| 2006/0059096 A1 * | 3/2006 | Dublish et al. | .................. | 705/57 |
| 2008/0081640 A1 * | 4/2008 | Tran et al. | .................. | 455/456.3 |
| 2008/0092157 A1 * | 4/2008 | Walter et al. | .................... | 725/25 |
| 2008/0104632 A1 * | 5/2008 | Kwon | ............................. | 725/32 |
| 2008/0305738 A1 * | 12/2008 | Khedouri et al. | ............ | 455/3.06 |
| 2009/0132682 A1 * | 5/2009 | Counterman | ................. | 709/220 |
| 2009/0132823 A1 * | 5/2009 | Grimen et al. | ................ | 713/171 |
| 2009/0164778 A1 * | 6/2009 | Chaudhry | ..................... | 713/159 |
| 2009/0183195 A1 * | 7/2009 | Alve | ................................ | 725/25 |
| 2009/0235303 A1 * | 9/2009 | Yamaoka et al. | ................ | 725/31 |
| 2009/0235315 A1 * | 9/2009 | Sharkey et al. | .................. | 725/68 |
| 2010/0146527 A1 * | 6/2010 | Craib et al. | ........................ | 725/5 |
| 2011/0030022 A1 * | 2/2011 | Todd et al. | ...................... | 725/109 |
| 2011/0041149 A1 * | 2/2011 | Piepenbrink et al. | ........... | 725/28 |
| 2011/0067067 A1 * | 3/2011 | Ellis | ................................. | 725/50 |
| 2011/0173249 A1 * | 7/2011 | Lee et al. | ....................... | 709/203 |
| 2011/0176496 A1 * | 7/2011 | Roy et al. | ....................... | 370/329 |
| 2012/0159533 A1 * | 6/2012 | Reddy et al. | ..................... | 725/31 |
| 2014/0101712 A1 * | 4/2014 | Oesterreicher et al. | ....... | 725/134 |

* cited by examiner

*Primary Examiner* — Nathan Flynn
*Assistant Examiner* — Alfonso Castro

(57) ABSTRACT

Content, such as audio or video content, is streamed to portable devices based on an entitlement determination that includes determining the location of the portable device and whether the content is subject to blackout restrictions. In one implementation, requests may be received for content that is to be streamed to a portable device and a location of the portable device may be determined. Entitlements may be determined, where the entitlements define whether the content is permitted to be viewed by the portable device, where the entitlements are determined based at least on the indication of the location of the portable device and based on blackout restrictions applicable to the content. The content may be selectively streamed to the portable device based on the applicable blackout restrictions.

21 Claims, 11 Drawing Sheets

| ITEM DESCRIPTION 410 | SUBSCRIPTION REQUIREMENT 420 | LOCATION RESTRICTIONS 430 | BLACKOUT RESTRICTIONS 440 |
|---|---|---|---|
| CHANNEL 1 | TIER1 | REGION1 | YES (LINK B/O OBJECT) |
| CHANNEL 2 | TIER2 | HOME | NO |
| PAY-PER-VIEW 1 | ANY | NONE | NO |
| ... | ... | ... | ... |

Fig. 4

CONTENT BLACKOUT DETERMINATIONS FOR PLAYBACK OF VIDEO STREAMS ON PORTABLE DEVICES

BACKGROUND

Video content (e.g., television broadcasts, pay-per-view (PPV) content, video-on-demand (VOD) content, etc.) may be delivered and selected in several ways. For example, television channels may be broadcast to users. Traditionally, television broadcasts have been viewed on televisions sets. More recently, users have been offered the ability to view television broadcasts on other devices, such as desktop computers, portable computers, and portable communication devices.

Content owners may wish to place limits on how a user is allowed to view video content. For example, certain content may only be available to subscribers of a certain "premium" channel or other service. As another example, some subscribers may be given immediate access to certain content while other subscribers, such as those subscribing to a more basic level of service, may be required to wait a certain time period before being able to view the content. It is thus desirable for a content provider to be able to effectively determine and enforce whether a subscriber is entitled to view content based on a wide variety of possible entitlement factors.

BRIEF DESCRIPTION OF THE DRAWINGS

FIG. 4 is a diagram illustrating an example data structure that may store information relating to viewing restrictions for content items;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may allow customers that are subscribed to a television service to view certain channels on devices, such as portable communication devices, other than the customers' televisions. Before being allowed to view a channel, an entitlement determination may be made for the channel. The entitlement determination may be based on a number of factors, including whether the desired channel is the subject of a blackout restriction.

A "blackout restriction," as used herein, broadly refers to a restriction, placed on video or audio content, by the content's owner, indicating that the content should not be shown in certain geographical areas. A blackout restriction may be imposed on content due to, for example, external factors determined by the content owner. In the context of sports broadcasting, for example, stadium events that do not sellout or that do not attract a certain level of attendees may have the broadcast of the stadium event blocked in the local market area of the stadium event, but allowed to be broadcast outside of the local market area. In general, blackout restrictions may be arbitrarily imposed and removed by the content owner.

In one example implementation, a subscriber to content, such as video or audio content, may wish to view the content on a portable device, such as a laptop or tablet computing device. Entitlements to available content may be determined based on a number of factors, including the location of the portable device and whether blackout restrictions apply to the location.

Figure 1:
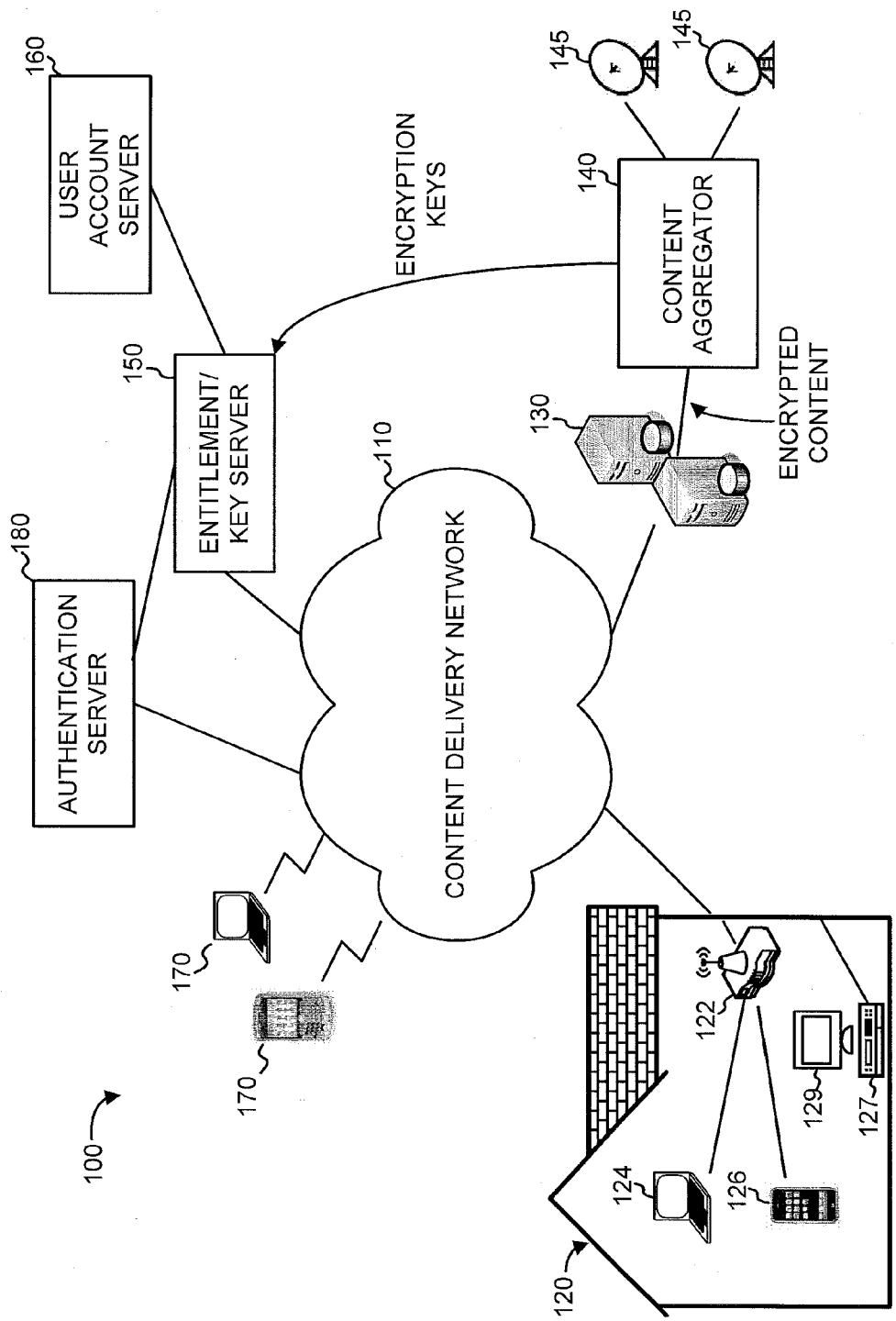
FIG. 1 is a diagram of an example environment in which systems and/or methods described herein may be implemented.

FIG. 1 is a diagram of an example environment 100 in which systems and/or methods described herein may be implemented. As illustrated, environment 100 may include a content delivery network 110, customer premises 120, content servers 130, content aggregator 140, entitlement and/or key server 150, user account server 160, computing devices 170, and authentication server 180. Content aggregator 140 may be coupled to one or more devices, such as satellites 145, through which content (e.g., television content) is received. Customer premises 120 may include one or more devices that can connect to content delivery network 110, such as wireless router 122, laptop computer 124, portable device 126, set-top box (STB) 127, and/or television 129. Other computing devices 170, such as laptop computers and portable communication devices, may also connect to content delivery network 110.

Content delivery network 110 may generally include a local area network (LAN), a wide area network (WAN), a metropolitan area network (MAN), a wireless network, an optical fiber (or fiber optic)-based network, a cable television network, a satellite television network, or a combination of networks. Content delivery network 110 may, in one implementation, include an IP-based network. In some implementations, content delivery network 110 may include a private network controlled by, for example, a telecommunications company that provides television, telephone, and/or data access to customer premises 120. Additionally or alternatively, content delivery network 110 include be a public network, such as the Internet.

Customer premises 120 may include a residential or business entity that is connected to content delivery network 110 by a service provider (e.g., a telecommunication company). Customer premises 120 may be connected to content delivery network 110 using, for example, a fiber optic connection, a coaxial connection, a satellite connection, or another type of wireless or wired connection. A gateway device may be used to connect customer premises 120 to content delivery network 110. For example, for a fiber optic connection, an optical network terminal (ONT) may convert the optical signals into an electrical format that can be used by wireless router 122. Alternatively, the functionality of the ONT may be incorporated into wireless router 122. Devices in customer premises 120 may include, for example, STBs (e.g., STB 127), televisions (e.g., television 129), computers (e.g., laptop computer 124), portable devices (e.g., portable device 126), and home networking equipment (e.g., routers, cables, splitters, local gateways, etc.). Devices within customer premises 120 may be connected via wired connections (e.g., coaxial cable, Telecommunications Industry Association category 5 ("cat 5") cable, etc.) and/or wireless connections (e.g., using network devices such as those available under the IEEE 802.11 wireless LAN standards). In the example shown in FIG. 1, customer premises 120 includes wireless router 122, which connects laptop computer 124 and portable device 126 to content delivery network 110. Additionally, STB 127 is shown as connecting to a television 129. STB 127 may be used to control the content shown on television 129 and may connect to content delivery network 110 via a wired connection.

Content servers 130 may include one or more server devices that store content, such as video content, that may be delivered to customer premises 120 and/or other computing devices 170. The content may include, for example, television broadcasts, video-on-demand programming, or other video content. Content servers 130 may deliver the stored content as on-demand streaming content. The television programming may be stored and made available, by content servers 130, in real-time or near real-time relative to the original broadcast of the television programming. In addition to storing video content, content servers 130 may store other information, such as index information that provides links to keys needed to decrypt the content and listing information that provides a description of the content that is available to the customer.

Content aggregator 140 may aggregate content, such as television programming, from a number of sources. Content aggregator 140 may, for example, receive signals for national television channels via satellites 145. Content aggregator 140 may also receive and store local television programming. In one implementation, content aggregator 140 may be distributed over a number of geographical regions. For example, content aggregator 140 may be present at each of a number of local markets, where the content aggregator associated with each local market may receive and store local programming for that market. In this situation, national television programming may be captured at a central facility and transmitted to each of the local content aggregators. Content aggregator 140 may additionally encrypt its received content. In one implementation, content aggregator 140 may encrypt incoming video streams, using, for example, a symmetric encryption technique such as AES (Advanced Encryption Standard). The encrypted video streams may be encrypted as discrete sections in which the encryption is changed for each section. Content aggregator 140 may transmit the encryption keys to entitlement/key server 150.

Entitlement/key server 150 may include one or more server devices that provide authentication and eligibility determinations for users that wish to view content stored at content servers 130. Entitlement/key server 150 may, for example, operate to authenticate the user and provide session decryption keys through which the user may decrypt content from content servers 130. In one implementation, user authentication may be provided with the assistance of a third party, such as a third party certificate authority, illustrated as authentication server 180.

User account server 160 may include one or more server devices that include account information for a customer. The account information may include information relating to programming (e.g., television channels), packages, or services to which a user has subscribed. User account server 160 may include other information relating to the users, such as the equipment installed at the customer premise. For example, a telecommunications company may provide each of customer premises 120 with a router, such as wireless router 122. Identification information for wireless router 120, such as a media access control (MAC) address associated with the router, or the IP address assigned to the router, may be stored by user account server 160. Entitlement/key server 150 may contact user account server 160 when performing entitlement checks and/or key delivery.

Computing devices 170 may include other computing devices, such as laptop computers and/or portable communication devices, that may connect to content delivery network 110. Portable devices from within customer premises 120, when taken outside of customer premises 120, may be referred to as computing devices 170.

Authentication server 180 may provide authentication services for users that wish to receive video streams from content servers 130. Authentication server 180 may, for example, receive and process HTTPS (hyper text protocol secure) requests from users. Authentication server 180 may communicate the results of an authentication to entitlement/key server 150. In some implementations, authentication may be performed by entitlement/key server 150 and the functionality of authorization server 180 may be incorporated into entitlement/key server 150.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more tasks described as being performed by one or more other components of environment 100.

Figure 2:
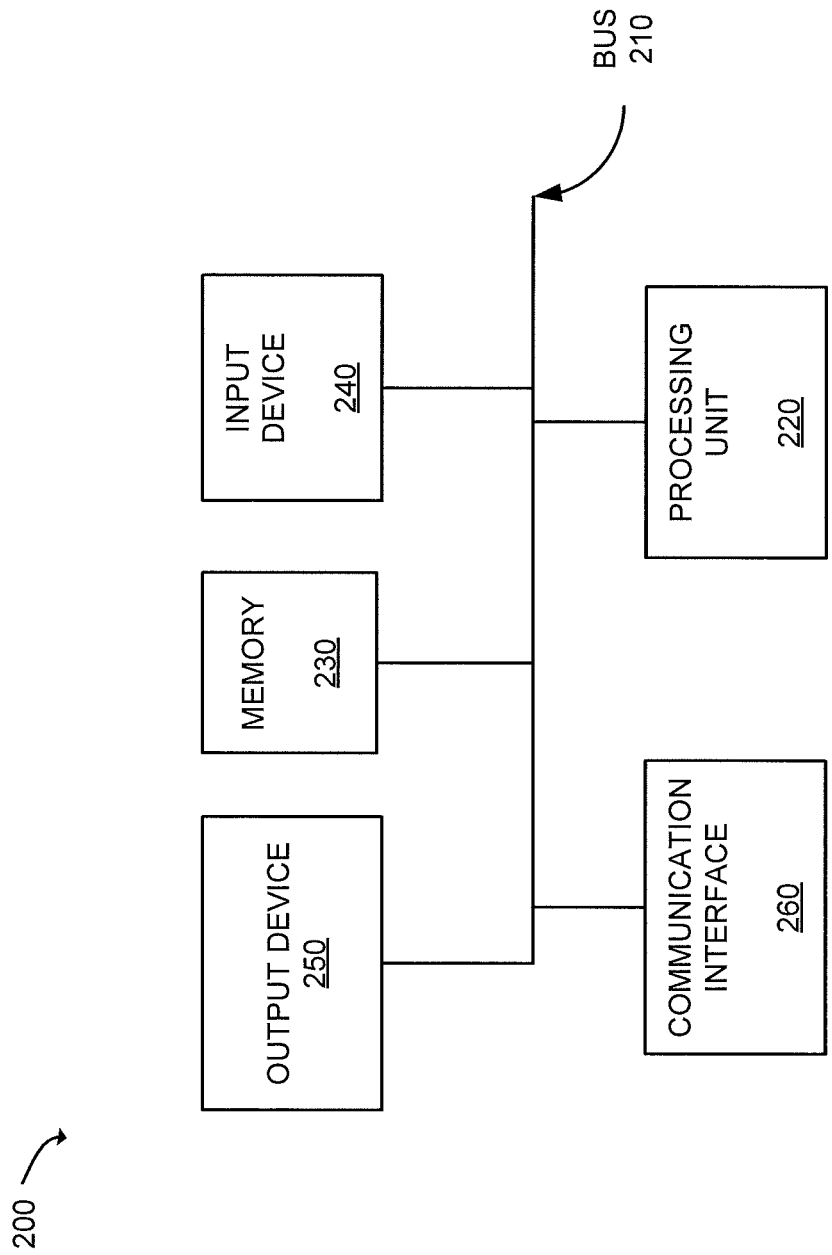
FIG. 2 is a diagram of example components of a device that may correspond to one of the devices in the environment shown in FIG. 1.

FIG. 2 is a diagram of example components of a device 200 that may correspond to one of the devices of environment 100 and/or customer premises 120. Device 200 may be included in, for example, content servers 130, content aggregator 140, entitlement key/server 150, user account server 160, authentication server 180, wireless router 122, laptop computer 124, portable device 126, set-top box 127, and/or computing device 170. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of environment 100 and/or customer premises 120.

As described herein, device 200 may perform certain operations in response to processing unit 220 executing software instructions contained in a computer-readable medium, such as memory 230. A computer-readable medium may be defined as a non-transitory memory device. A memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3:
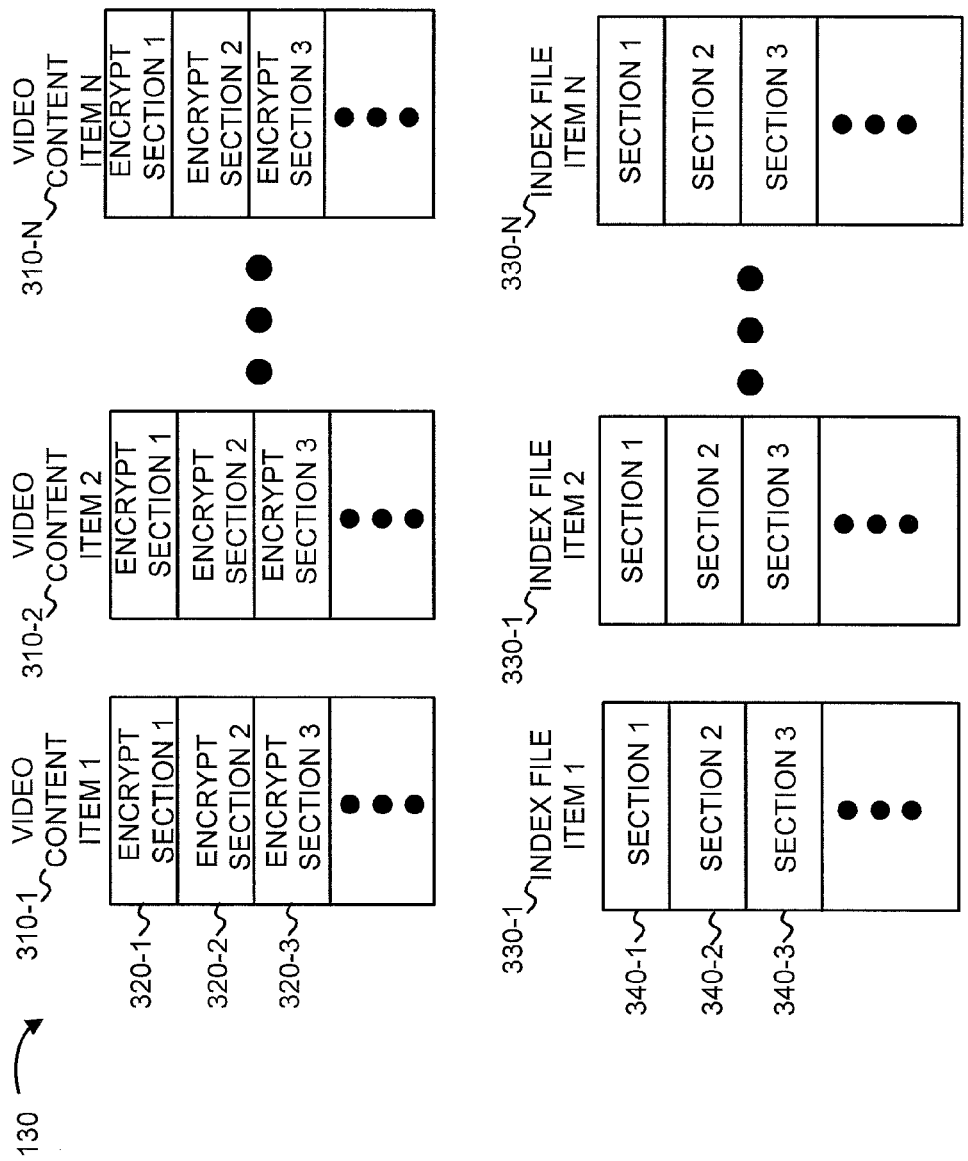
FIG. 3 is a diagram illustrating an example of data structures implemented by the content server shown in FIG. 1.

FIG. 3 is a diagram illustrating an example of data structures implemented by content servers 130. As previously mentioned, content servers 130 may store content, such as television programming (live or delayed broadcasts), video on demand programming, or other types of content. The content may be received as streams of data from content aggregator 140. The streams may each be encrypted by content aggregator 140, such as by using 128 bit AES encryption (or another encryption algorithm).

As shown in FIG. 3, content received and stored by content servers 130 is illustrated as including video content items 310-1 (video content item 1) through video content item 310-N (video content item N). Each video content item 310 may correspond to, for example, a television program, a television broadcast stream, a video on demand movie, or another content item that may be delivered to a user. Each video content item 310 may be divided into sections, in which each section may be encrypted using a different encryption key. Video content item 310-1, for example, is shown as including three sections, section 320-1 (encrypt section 1), 320-2 (encrypt section 2), and 320-3 (encrypt section 3). The length of each section 320 may be, for example, based on a certain time duration (e.g., 30 minute sections), a target section size, or based on other factors. In the situation in which video content items 310 correspond to television broadcasts, each section 320 may correspond to a show or program.

Content servers 130 may also store an index file relating to each of the video content items 310. The index files are shown in FIG. 3 as including index files 330-1 through 330-N. Each index file 330 may include information corresponding to each of the encrypted sections 320 of video content items 310. Index file 330-1, for example, is illustrated as including sections, 340-1, 340-2, and 340-3, which may correspond to content sections 320-1, 320-2, and 320-3, respectively. Each section 340 may include, for example, information such as the beginning and end of the section, a link or other resource indicating the location of the decryption key file for the section, and/or descriptive information relating to the section. In one implementation, each of index sections 340-1 may include a uniform resource locator (URL) that points to a resource on entitlement/key server 150 at which the decryption key file for the corresponding content section 320 can be obtained.

By dividing a content item 310 into sections, the decryption key for the content item may be rotated. Each key rotation (i.e., each new section 320), may require the viewing device (e.g., computing device 170, etc.) to re-request the appropriate key file. Accordingly, a viewing device that becomes ineligible to receive the content may be denied access to the content.

Although FIG. 3 shows example components of content servers 130, in other implementations, content servers 130 may contain fewer components, different components, differently arranged components, or additional components than depicted in FIG. 3.

FIG. 4 is a diagram illustrating an example data structure 400 that may store information relating to viewing restrictions for content items 310. Data structure 400 may be stored at, for example, content aggregator 140 or entitlement/key server 150. Content owners may place restrictions on the devices that are allowed to playback a particular content item. Data structure 400 may be used to maintain the current restrictions placed on a content item.

Data structure 400 may include an item description field 410, an item subscription requirement field 420, a location restrictions field 430, and a blackout restrictions field 440. Each entry in data structure 400 may correspond to a content item 310. Item description field 410 may include a description of the content item. As shown, item description field 410 may include a label that indicates whether the content is a live television channel or another type of video stream (e.g., a pay-per-view movie). The first and second entries in data structure 400, for example, may correspond to television channels. The third entry in data structure 400 may correspond to a pay-per-view content item. In some implementations, item description field 410 may also include a link back to the content item 310 to which the content item corresponds.

Subscription requirement field 420 may include information describing the subscription plan or account options that need to be subscribed to, by a customer, before the customer can stream the corresponding content item to a portable device. In the example shown, the first entry in data structure 400 has a subscription requirement of "tier1," the second entry has a subscription requirement of "tier2," and the third entry has a subscription requirement of "any." These values may indicate that the content item corresponding to the first entry ("channel 1") can be received when the user is subscribed to the "tier 1" subscription package and the content item corresponding to the second entry ("channel 2") can be received when the user is subscribed to the "tier 2" subscription package. The content item corresponding to the third entry ("pay-per-view 1") can be received with any subscription package.

Location restrictions field 430 may include information describing geographic restrictions that are placed on the playing back of the corresponding content item. Certain content items may only be played back to a portable device when the portable device is in a certain geographic location or region. The geographic location may include a geographic area that covers the subscriber's home (i.e., customer premises), a larger geographic region (such as a particular country, time zone, state, or other region), or another geographic area. In the examples shown in FIG. 4, the first entry in data structure 400 has a location restriction of "region1," the second entry has a location restriction of "home," and the third entry has a location restriction of "none." These values may indicate that the content item corresponding to the first entry ("channel 1") can be received when the user is in the geographic area called "region 1" and the content item corresponding to the second entry ("channel 2") can be received when the user is at the user's home. The location of the user may not be relevant to whether the content item corresponding to the third entry ("pay-per-view 1") can be received.

Blackout restrictions field 440 may include information describing blackout restrictions that are placed on the playing back of the corresponding content item. In the example shown, blackout restrictions field 440 may indicate whether any blackout restrictions are applicable to each content item. Many content items may not have associated blackout restrictions. For example, as shown in FIG. 4, the second and third content items are shown as not being associated with any blackout restrictions. The first content item (CHANNEL 1), however, is indicated as being associated with a blackout restriction.

In one implementation, when a content item is associated with blackout restrictions, blackout restrictions field 440 may include a link to an object defining the particular conditions defining the blackout restriction. Alternatively, the conditions defining the blackout restrictions may be included in blackout restrictions field 440 or blackout restrictions field 440 may simply include a yes/no indication of whether the content item is blacked out.

In the example of FIG. 4, the content item CHANNEL 1 is illustrated as being subject to blackout restrictions, as defined by a link to a "blackout object" (LINK B/O OBJECT). The link to the blackout object may include, for example, a key, link, or other identifier to the blackout object.

Blackout restrictions field 440 may be a field that is updated by or on behalf of the content owner of each corresponding content item. Thus, the current blackout restrictions imposed on a particular content item may change from time to time. For example, a particular live television channel may include blackout restrictions while a particular program is being broadcast (e.g., a sports program), but the blackout restrictions may be removed when the particular program is over and the next program begins. Thus, during the broadcast of the particular program, blackout restrictions field 440 may be set to YES and may link to a blackout object, but after the particular program is broadcast, blackout restrictions field 440 may be set to NO.

Data structure 400 illustrates a number of example fields that may be associated with content items. In alternative implementations, additional or fewer fields may be used to determine entitlements to content items. For example, content items may be additionally associated with time based restrictions (e.g., a content item may only be viewed at certain times or after a certain date) and a field may be used in data structure 400 to maintain the time based restrictions.

Figure 5:
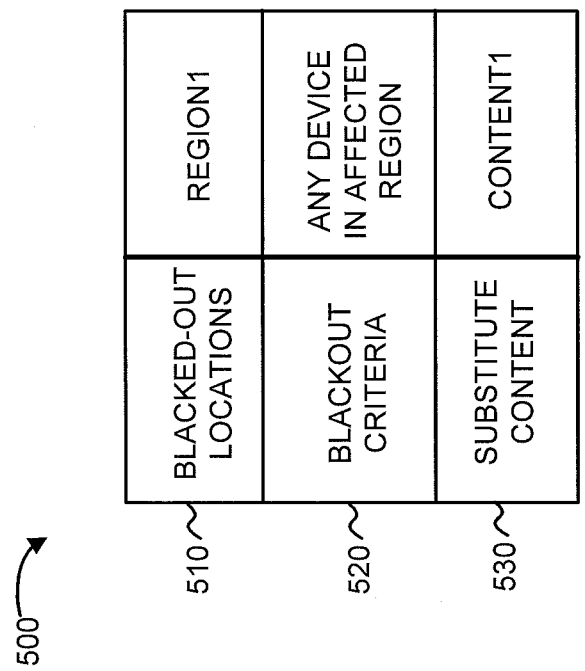
FIG. 5 is a diagram illustrating an example data structure that may store information defining conditions relating to a blackout restriction.

FIG. 5 is a diagram illustrating an example data structure 500 that may store information defining conditions relating to a blackout restriction. Data structure 500 may be stored at, for example, content aggregator 140 or entitlement/key server 150. Data structure 500 may be related to data structure 400, such as by virtue of being a data structure that is linked to or referenced by a blackout restrictions field 440 in data structure 400.

Data structure 500 may be an object that includes, for example, a blacked-out locations field 510, a blackout criteria field 520, and a substitute content field 530. As previously mentioned, data structure 500 may be associated with a particular content item and may include information that defines conditions and/or parameters relating to the blacked-out content.

Blacked-out locations field 510 may include an indication of the regions that are blacked-out for the particular content item. For example, blacked-out locations field 510 may include one or more geographic region labels (e.g., the "New York City Area", "region1", etc.), one or more geographic regions defined by a coordinate system (e.g., a latitude/longitude based system), or other information that defines geographic regions that are to be blacked-out. In the example shown in FIG. 5, the region "region1" is to be blacked-out. "Region1" may correspond to, for instance, users within a viewing area corresponding to a particular market or city.

Blackout criteria field 520 may include one or more rules that may define which users or accounts are subject to the blackout restriction. For example, and as shown in FIG. 5, the rule may be "any device in the affected region," indicating the blackout is to cover all broadcasts of the video content in the affected region(s). Other rules may be used to permit some users to receive the otherwise blacked-out broadcasts. For example, users of certain account types or subscribers to certain video packages may be exempted from the blackout restrictions. As another example, blackout restrictions may also take into account the user's home location (i.e., the address of customer premise 120). For example, if the user's home location is in Houston, Tex. and the user is attempting to view a sporting event, via portable device 126 while in the Denver, Colo. area, that is blacked-out in the Denver area but not blacked out in the Houston area, the user may be exempted from the blackout and allowed to view the sporting event. In this situation, blackout criteria field 520 may specify, for example, that a device that corresponds to a customer premise in "region2" (e.g., the Houston area) may be exempted from the blackout.

In some situations, content, such as a live television broadcast, when blacked-out, may, instead of showing a blank or unavailable video stream, may include substitute content instead. For instance, if a broadcast of a sporting event is blacked-out in a particular area, a movie may be shown instead. Substitute content field 530 may include an indication of the substitute content item to present, if any, in place of the blacked-out content.

Data structure 500 illustrates a number of example fields that may store information defining conditions relating to a blackout restriction. In alternative implementations, additional or fewer fields may be used in data structure 500.

As previously mentioned, techniques described herein may be used to playback video content delivered from content servers 130 to portable devices. The video content may be content designed to play on portable devices such as smart phones, tablet or "pad" computers, or laptops. In one implementation, to playback the video content, a user may first download and install a video playback application ("app") on the computing device. The playback application may then communicate with content servers 130, entitlement/key servers 150, and/or authentication server 180 to download and playback the desired video content. In one implementation, the video content may be delivered over content delivery network 110 using a packet streaming protocol, such as the known HTTP Live streaming protocol. In situations in which customer premises 120 connects to a telecommunications provider so that the subscriber can receive both traditional television signals, via a dedicated connection, and IP based data services, such as an Internet connection, the video content delivered to the playback application may be delivered via the IP-based packet network (also referred to as over-the-top (OTT) delivery herein).

Figure 6:
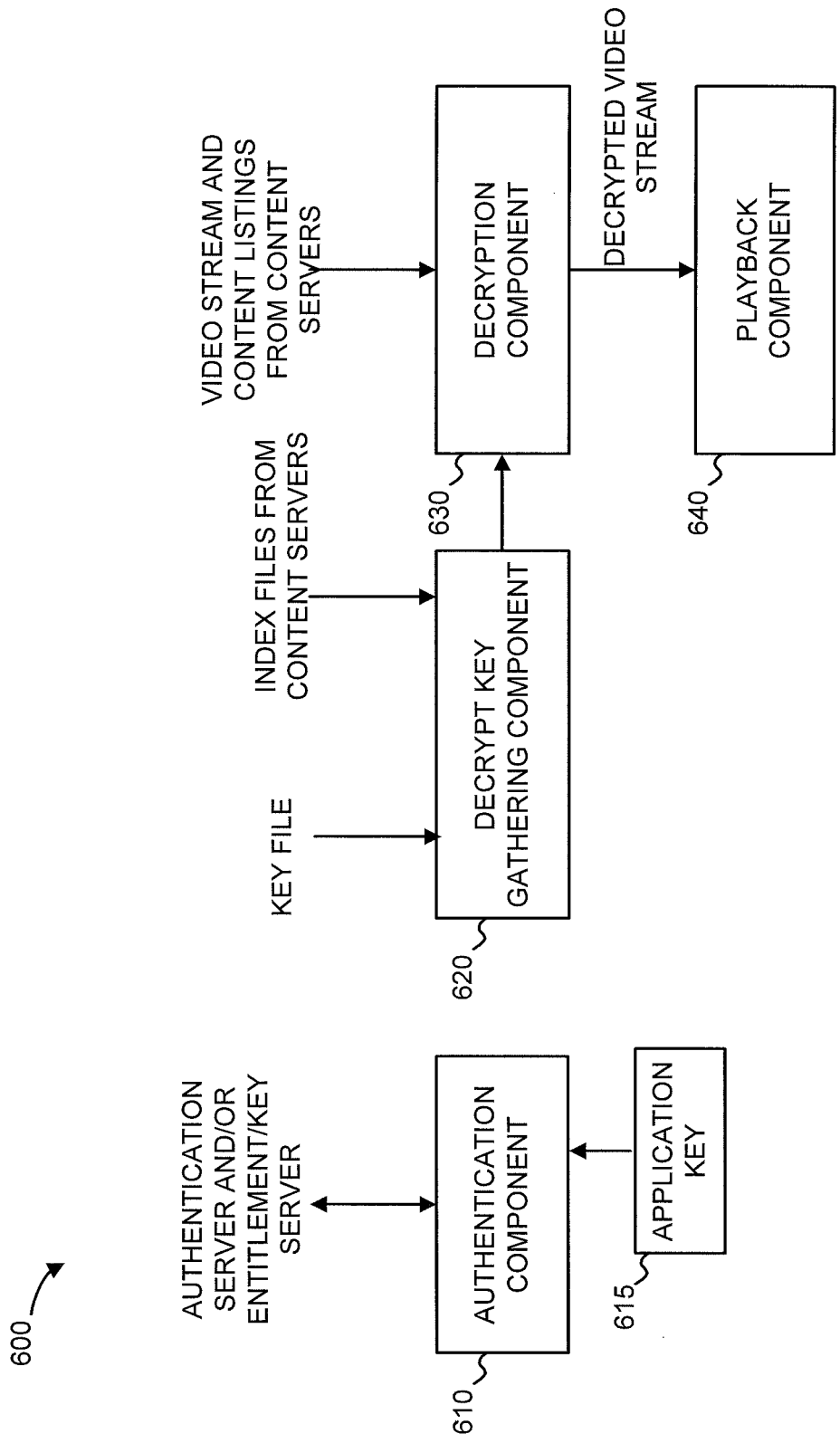
FIG. 6 is a diagram illustrating an example of functional components of a playback application, such as an application run on a portable computing/communication device.

FIG. 6 is a diagram illustrating an example of functional components of a playback application 600, such as an application run on a portable computing/communication device (e.g., laptop computer 124, portable device 126, computing devices 170). Playback application 600 may be particularly designed to display content that is entitled to be played back by the user, receive a user's selection of content items, and playback the selected content item. In this manner, a user can enjoy video content items, which may be derived from traditional television programming.

As shown in FIG. 6, playback application 600 may include an authentication component 610, an application key 615, a decrypt key gathering component 620, a decryption component 630, and a playback component 640.

Authentication component 610 may communicate with authentication server 180 and/or entitlement/key server 150 to authenticate the user of playback application 600 and to obtain permission to view a selected program. Decrypt key gathering component 620 may generally receive the index file 330 corresponding to selected content item and may obtain one or more decryption key files for the content item. Index file 330 may be obtained from content servers 130 and the decryption keys may be obtained from entitlement/key server 150. Decrypt component 630 may receive, for example, an encrypted version of the video stream from content servers 130. Using the obtained decryption key, decryption component 630 may decrypt an incoming video stream corresponding to the selected program. Playback component 640 may playback the decrypted video stream to the user, such as on an LCD display of the portable computing/communication device. The operation of the components of playback application 600, and its interaction with other elements of environment 100, will be described in more detail below with reference to FIGS. 7-9.

Application key 615 may be included as part of playback application 600. Application key 615 may be a value that is used by playback application 600 when authenticating playback application 600. In some implementations, different versions of playback application 600 may be released for different portable device platforms. In this case, application key 615 may be different for each portable device platform.

Although FIG. 6 shows example components of playback application 600, in other implementations, playback application 600 may contain fewer components, different components, differently arranged components, or additional components than depicted in FIG. 6. Alternatively, or additionally, one or more components of playback application 600 may perform one or more tasks described as being performed by one or more other components of playback application 600.

Figure 7:
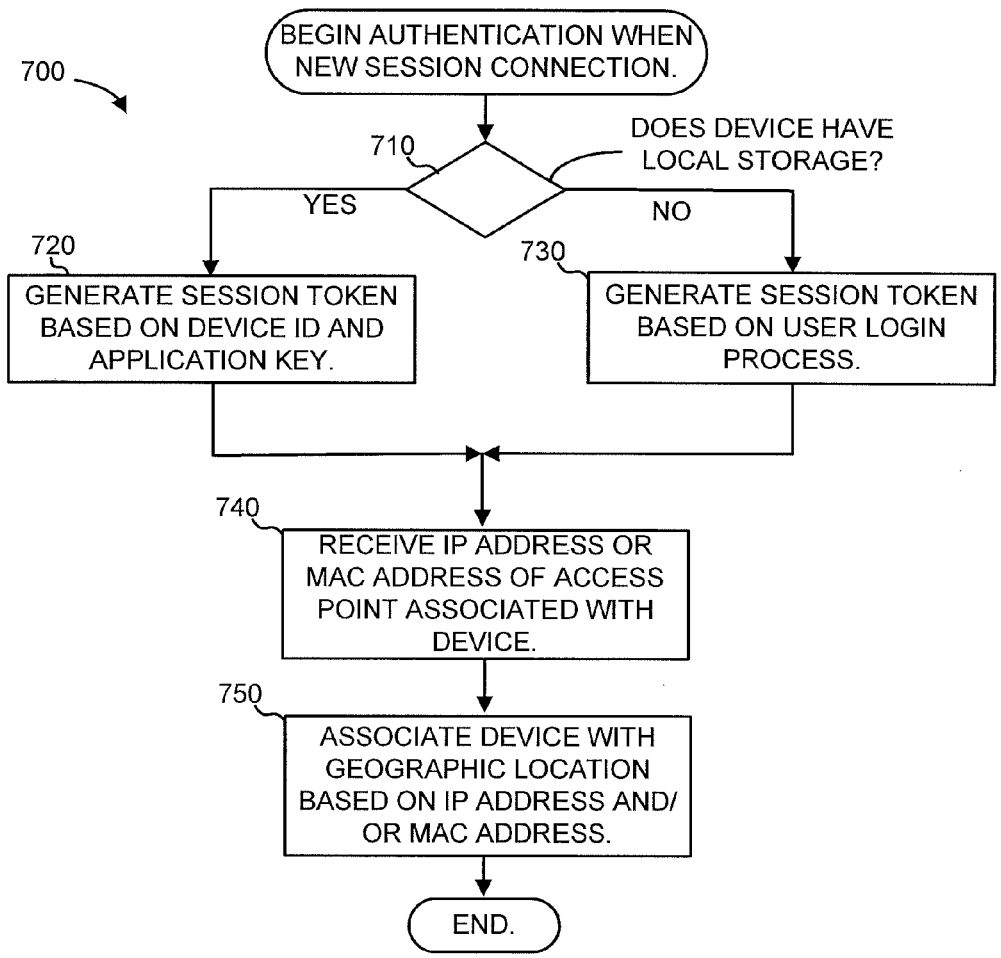
FIG. 7 is a flow chart illustrating an example process for authenticating a playback application to playback requested video content.

FIG. 7 is a flow chart illustrating an example process 700 for authenticating playback application 600, executing at a portable device, to playback requested video content. Process 700 may be performed by playback application 600 whenever playback application 600 is initiated or whenever a new session is established by the portable device. A new session may be established by the portable device whenever the portable device connects to a new access point (e.g., wireless router 122) or other network connection. For example, if the user moves from his home to a retail outlet, the user's session with wireless router 122 may be lost when the user moves out of range of wireless router 122 and a new session with a wireless router at the retail outlet may be established when the user moves into range of the wireless router at the retail outlet. Authentication may be performed when the user's portable device begins a new network session with wireless router 122 and again when the user connects to the wireless router at the retail outlet.

Authentication may be performed differently depending on whether the portable device includes local storage. Process 700 may thus include determining whether the portable device includes local (i.e., non-volatile) storage (block 710).

When the portable device includes local storage (block 710—YES), process 700 may include generating a session token based on a device identification value (ID) and based on application key 615 (block 720). The device ID may be a value that is unique to the portable device hardware, such as a value stored in a read-only memory or other non-volatile memory of the portable device. An encrypted version of the session token may be transmitted to entitlement/key server 150 or another server, such as authentication server 180. In one implementation, the encrypted version of the token may be transmitted over an HTTPS session in which a third party server, such as authentication server 180, is used as part of the authentication.

When the portable device does not include local storage (block 710—NO), process 700 may include generating a session token based on a user login process (block 730). For example, the user may be required to enter an account ID and/or password. The account ID and/or password may be used to authenticate playback application 600 to entitlement/key server 150, which may then transfer the session key to the portable device.

Alternatively, instead of determining whether the portable device includes local storage, different versions of playback application 600 may be distributed for different portable devices/platforms. In this situation, whether playback application 600 generates a session token based on the operations of blocks 720 or 730, may be hardcoded into playback application 600.

Process 700 may further include receiving the IP address or MAC address associated with the access point that is being used by the portable device during the current session (block 740). This information may be received from the portable device as part of the initial authentication performed by playback application 600.

Process 700 may further include associating the portable device with a geographic location or region based on the received IP address or MAC address (block 750). Entitlement/key server 150 may, for example, compare the received IP or MAC address to the corresponding IP or MAC address that is currently associated with the user's account. Entitlement/key server 150 may look up the expected IP or MAC address via a request to user account server 160. The IP address of the access point in customer premises 120 may, for example, be assigned to the access point by the company that provides playback application 600. Accordingly, this IP address may be known and associated with the customer's account. Similarly, the MAC address of the access point in customer premises 120 may be known and associated with the customer's account. In this case, the location of the portable device may thus be known as the address corresponding to the customer's account.

Other techniques for determining the user's location may also be used. For example, an IP address may, in general, be associated with geographic locations. For example, a certain IP address, even if it is determined to not correspond to a customer's premises, may be determined to be an IP address that is allocated to users of a particular city or other geographical region.

Still other techniques may alternatively be used to determine the geographic location of the user. For instance, some portable devices may include global positioning system (GPS) functionality through which the portable device can determine its location. Still further, other techniques for determining device location, such as triangulation using wireless base stations, may be used.

As will be described in more detail below, the determined location of the portable device may be used to determine entitlements, to content, such as entitlements based on blackout related restrictions.

Figure 8:
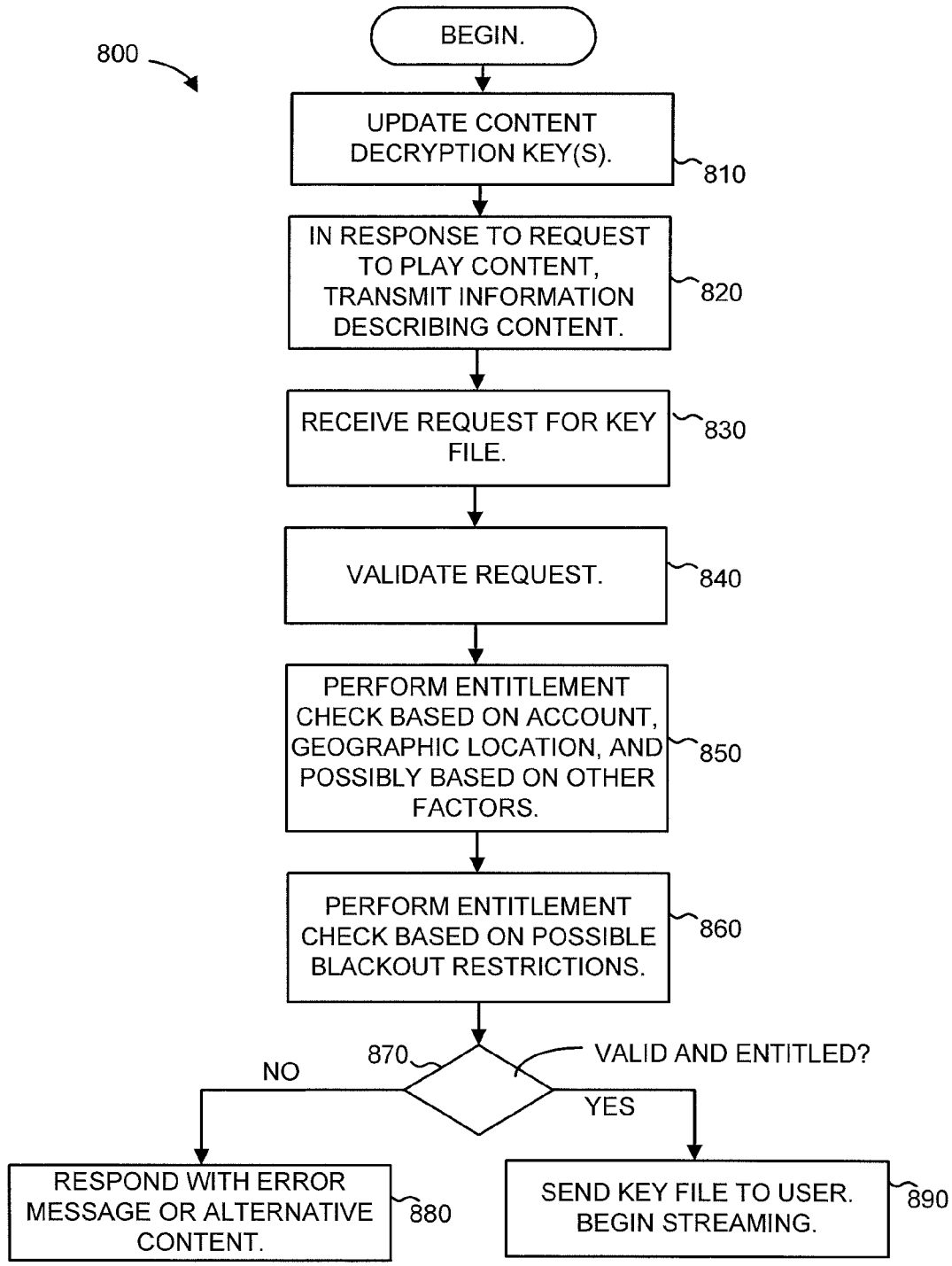
FIG. 8 is a flow chart illustrating an example process for streaming content to a playback application.

FIG. 8 is a flow chart illustrating an example process 800 for streaming content to playback application 600. Process 800 may be performed by, for example, one or more of content servers 130, content aggregator 140, entitlement/key server 150, and authentication server 180.

Process 800 may include updating the content decryption keys (block 810). As previously mentioned, content aggregator 140 may encrypt received content streams and provide the encrypted streams to content servers 130. The keys used to encrypt the content streams may periodically (e.g., every 30 minutes) be changed. The encryption keys may be published to entitlement/key server 150 and content servers 13, which may store index files 330 that provide links to key files that include the encryption keys.

As mentioned previously, a user of a portable device may, through playback application 600, request the playing of content, such as a request that a particular television channel be streamed to the portable communication device. In response to the request, content servers 130 may transmit information describing the content (block 820), such as one of index files 330. Index file 330 may include a link to the decryption key file corresponding to the desired content.

Playback application 600 may receive an index file 330, and based on the index file, may request the appropriate key file from entitlement/key server 150. For example, decrypt key gathering component 620 may request the key file, over the HTTPS session, based on the link in index file 330. The request may embed an encrypted session token (or other identifier) that may indicate that the request is part of a valid session.

Referring back to FIG. 8, entitlement/key server 150 may receive the request for the key file (block 830), and, in response, may validate the request (block 840). Validating the request may include validating the encrypted session token received with the request.

Process 800 may further include determining an entitlement check, relating to the requested content, based on the customer's account information, the geographic location of the portable device, and/or other factors (block 850). The entitlement check may include a just-in-time (JIT) check to ensure that the requesting portable device is entitled to receive the content item. The entitlement check may include comparing the location restrictions 430, subscription requirement restrictions 420, and/or other restrictions, which apply to the requested content item, to the location (e.g., "at home", "not at home", in a particular region) or user account information corresponding to the portable device. In one implementation, the location and/or user account information that is relevant to the entitlement determination may be included within the encrypted session token.

As an example of a location-based entitlement check, assume that the customer has requested the content item "channel 1" (FIG. 4, first content item). This content item includes the restriction that the content item can only be played back when the portable device is in "region1". Thus, the location-based entitlement check will only be satisfied when the previously determined location of portable device 126 is within "region1".

In some implementations, other checks may be made in addition to the content entitlement check. For example, a parental control feature may be enabled for the account, which may allow users to associate passwords with selected channels. In this case, the user entered password may be submitted as part of the key file request and checked as part of block 850.

Consistent with aspects described herein, a second entitlement check may be made based on whether the requested content is currently subject to blackout restrictions (block 860). The entitlement check based on blackout restrictions may include evaluating the blackout restrictions, from blackout restrictions field 440, corresponding to the requested content. For example, assume that blackout restrictions field 440 indicates that blackout restrictions currently apply to the requested content. Entitlement/key server 150 may retrieve a data structure (e.g., data structure 500), storing information defining the conditions relating to a potential blackout. Entitlement/key server 150 may evaluate the conditions to determine whether the blackout restrictions apply to portable device 126. For example, for the blackout restrictions specified using exemplary data structure 500, entitlement/key server 150 may determine that portable device 126 is subject to a blackout when portable device 126 is in "region1." In this case, portable device 126 would be not be entitled to view the requested content.

Process 800 may further include, when portable device 126 is determined to not be validated and/or not entitled to view the requested content, responding to the content request from portable device 126 with an error message or other indication that the content request is denied (blocks 870-NO; and block 880). Alternatively, instead of transmitting an error message, the requested content may simply not be presented to the user. As another alternative, in the case of a blackout restriction, alternate content, such as content specified in substitute content field 530 of data structure 500, may instead be selected and sent to the portable device.

Process 800 may further include, when portable device 126 is determined to be validated and entitled to view the requested content, transmitting the key file, such as by entitlement/key server 150, which contains the needed decryption key (blocks 870—YES; and block 890). Additionally, content server 130 may begin streaming the appropriate section 320 of the requested content item 310 (block 890).

Figure 9:
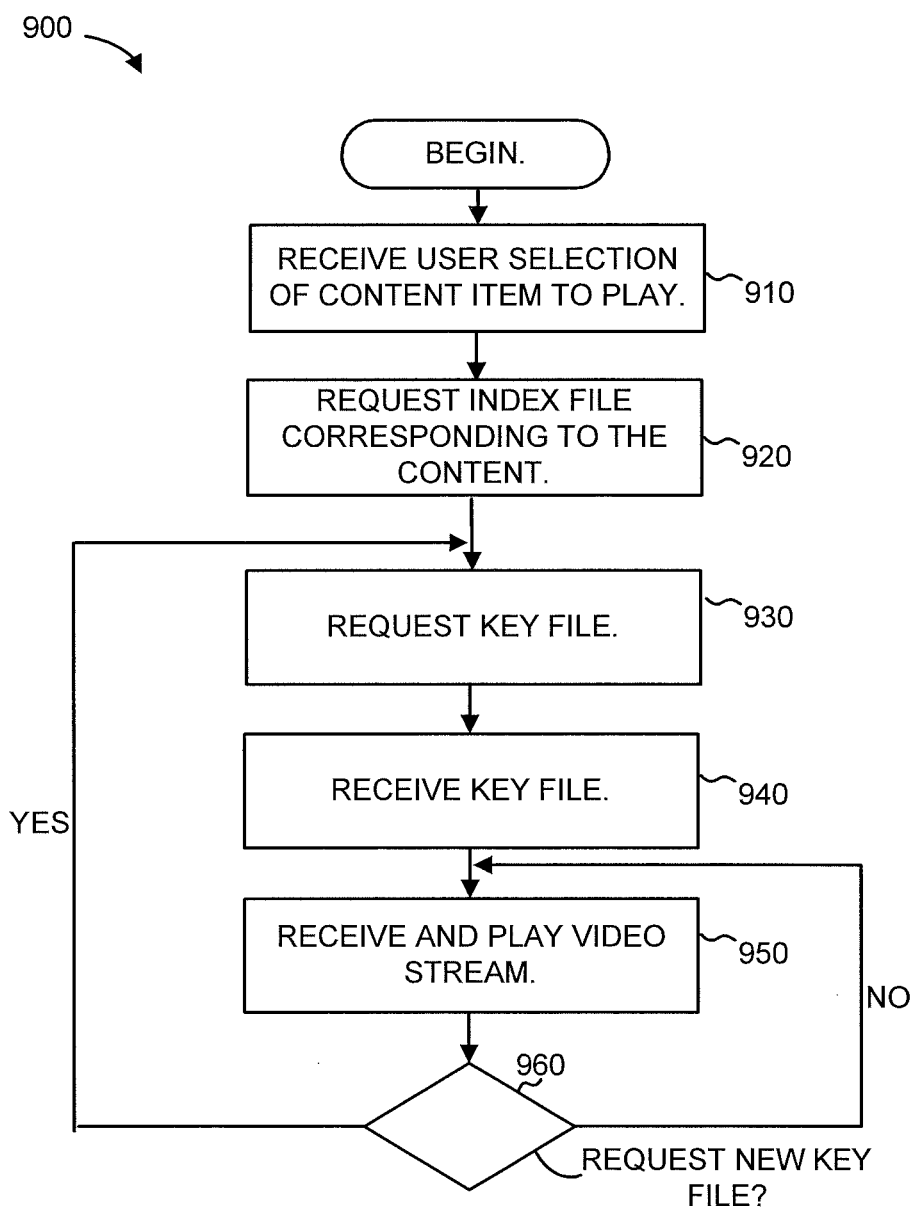
FIG. 9 is a flow chart illustrating an example process for receiving streaming content at a portable communication device.

FIG. 9 is a flow chart illustrating an example process 900 for receiving streaming content at a portable communication device. Process 900 may be performed, for example, by playback application 600, executing on a portable communication device.

At some point, the user of playback application 600 may select a particular content item to begin playback of the content item. Playback application 600 may receive the user's selection of the content item (block 910). Playback application 600 may, for example, present a graphical menu to the user, through which the user can select a video stream to play, such as a particular available television channel, show, or other content item.

Process 900 may further include, in response to the user selecting content to play, requesting the index file corresponding to the content (block 920). Decrypt key gathering component 620 of playback application 600 may, for example, request the index file 330 corresponding to the content from content servers 130. The index file 330 may include a link or other reference describing the resource to use to retrieve the decryption key for the content.

Process 900 may further include requesting the key file (block 930). For example, decrypt key gathering component 620 may use a link in index file 330 to request the key file, via an HTTPS request, from entitlement/key server 150. Decrypt key gathering component 620 may transmit, to entitlement/key server 150, the encrypted session token that was previously received during authentication of the portable communication device (e.g., as performed in process 600).

Process 900 may further include receiving the key file in response to the request made in block 930 (block 940). The key file may be received, for example, by decrypt key gathering component 620. The key file may include the decryption key needed to decrypt the requested content. In some implementations, the key file may include other information, such as an indication of when the decryption key expires (i.e., when a new key file should be requested).

Process 900 may further include receiving and playing the video stream from content servers 130 (block 950). Decryption component 630 of playback application 600 may receive the encrypted video stream from content servers 130. Decryption component 630 may use the key received in block 940 to decrypt the video stream. The video stream may then be played back to the user.

As mentioned previously, the key for a video stream may be changed at various times. Process 900 may further include determining if a new key file should be requested (block 960). The new key file may be requested periodically, based on a certain amount of received video content, or based on other factors. For example, each key file may include an indication of when the key in the key files expires. When it is time to request a new key file (block 960—YES), process 900 may return to block 930. Otherwise, the current key may continue to be used to playback the video stream (block 960—NO).

Figure 10:
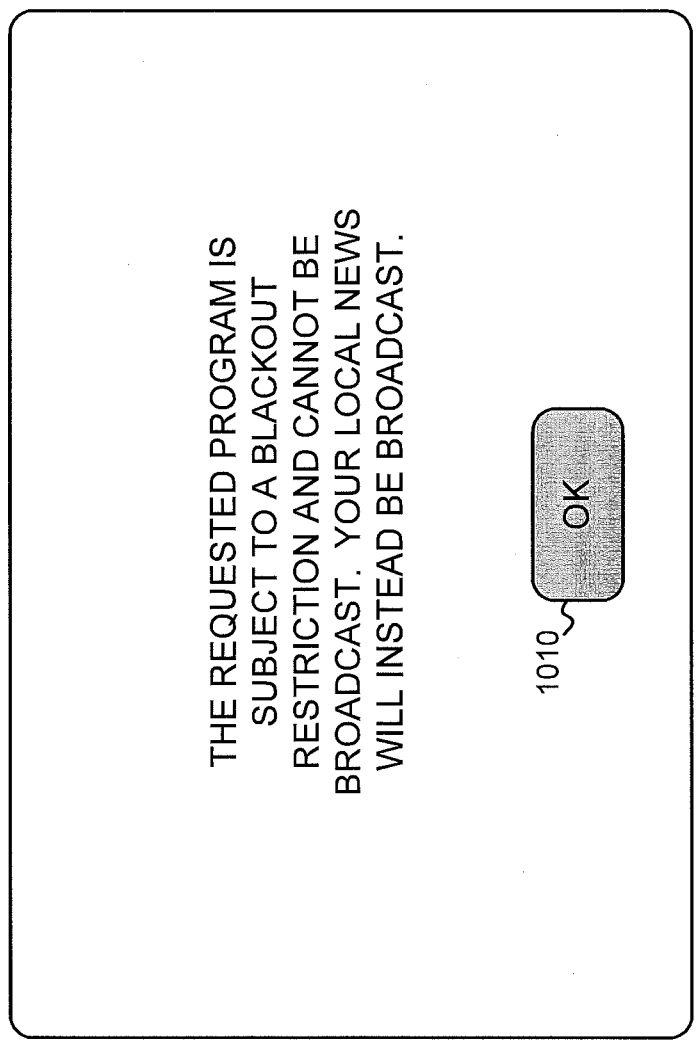
FIG. 10 is a diagram of an example graphical user interface, such as a user interface presented on portable device, in response to a request to view content that is blacked out.

FIG. 10 is a diagram of an example graphical user interface 1000, such as a user interface presented on portable device 126, in response to a request to view content that is blacked out. Assume, for example, that a customer requests to view a sporting event in a region in which the sporting event is blacked out. Entitlement/key server 150 may determine, as discussed previously, that the user is not entitled to view the sporting event. In response, portable device 126 may present interface 1000, which includes a message informing the customer that the requested program is subject to a blackout restriction. As shown, the message also informs the customer that another program will be substituted for the blacked out program. The customer may indicate acknowledgement of the message by selecting button 1010.

Figure 11:
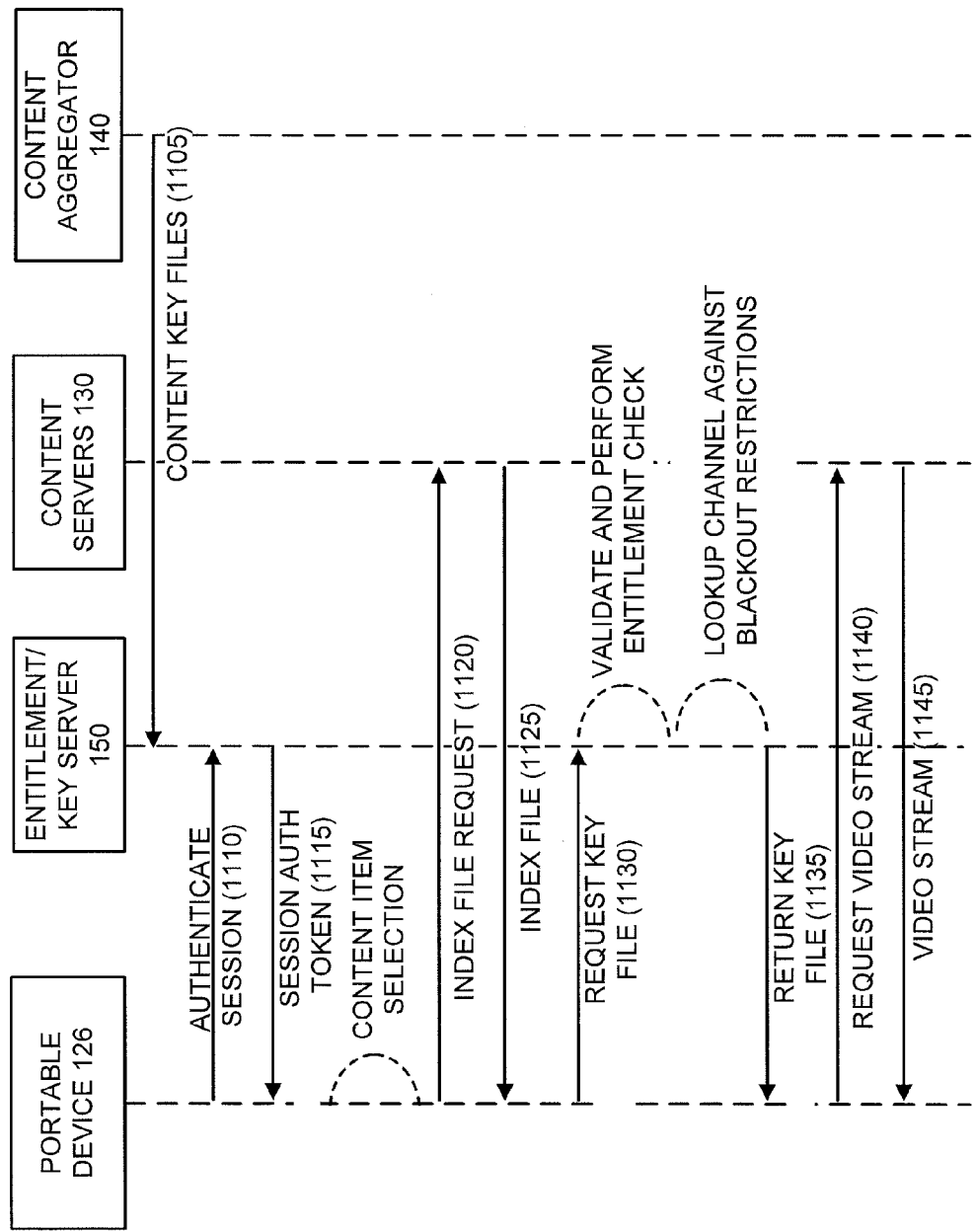
FIG. 11 is signal flow diagram illustrating an example of communications between components in a system during streaming of video content.

FIG. 11 is signal flow diagram illustrating an example of communications between components in system 100 during streaming of video content. In FIG. 11, assume that a live television channel is streamed to playback application 600, which is executing on a portable device.

Content aggregator 140, as it aggregates and encrypts incoming content, may upload decryption key files to entitlement/key server 150 (communication 1105). A new key file may be uploaded, for example, every 30 minutes or at every new television channel show or program.

At some point, such as whenever playback application 600 is initially started, and whenever portable device 126 changes network connections, playback application 600 may contact entitlement/key server 150 (or, alternatively, authentication server 180) to authenticate the current session (communication 1110). As mentioned above, the session authentication may include determining the geographic location of portable device 126. An encrypted session authorization token may be passed back to playback application 600 (communication 115). The session authorization token may only be valid for the current communication session with authentication server 180. In some implementations, the session authorization token may indicate the user's location or include other information.

At some point, the user may select a particular content item to view. In response, playback application 600 may request an index file, relating to the particular content items, from content servers 130 (communication 1120). Content servers 130 may return the index file to playback application 600 (communication 1125).

The index file may contain a link to the key file for the content item. Playback application 600 may thus use the index file to request the key file from entitlement/key server 150 (communication 1130). Entitlement/key server 150 may validate the user's session, such as by validating an encrypted session token that is passed to entitlement/key server 150 as part of the key file request. Entitlement/key server 150 may also perform an entitlement check relating to the requested content item. As previously discussed, the entitlement check may be based on whether restrictions associated with the content (e.g., geographic restrictions, subscription restrictions, etc.) are met.

The entitlement check may include determining whether the requested content item is subject to blackout. For example, the channel (i.e., the channel of the selected content item) and the user location may be used to determine, based on blackout restriction field 440, whether the content item should be subject to blackout.

If the validation and entitlement checks are successful, the key file may then be returned to playback application 600. In this example, assume, however, that the entitlement check was not successful because the requested content item is subject to blackout. In this case, a key file of substitute content may instead may returned to playback application 600 (communication 1135).

Playback application 600 may request the desired video content (or, for a blacked out video content, the video content of the substitute content) from content servers 130 (communication 1140). The video content may then be streamed to playback application 600 over content delivery network 110 (communication 1145). The streamed video content may be, for example, streamed "over the top" through an IP packet-based network.

As described above, video content may be streamed to a portable communication device. A user's entitlement to view the video content may be made based on a number of possible factors, such as the physical location of the portable device and blackout restrictions that apply to the video content. Advantageously, content owners/providers may have a relatively high level of flexibility in offering content.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 7-9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components and/or logic may include hardware, such as a processor, a microprocessor, an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more computing devices, the method comprising:
   receiving, by the one or more computing devices, a request for content streamed over an Internet Protocol (IP) network to a portable device, wherein the request includes information identifying the portable device;
   identifying a subscription plan or at least one account option associated with the portable device;
   determining, by the one or more computing devices, whether a subscription requirement associated with the requested content allows the portable device to receive the content based on the subscription plan or the at least one account option that is associated with the portable device;
   determining, by the one or more computing devices, an indication of a location of the portable device based at least on an IP address or media access control (MAC) address of an access point to which the portable device is connected;
   determining, by the one or more computing devices and in response to determining that the IP address or MAC address corresponds to an IP address or a MAC address of a location other than a customer premises, whether the IP address or MAC address is allocated to the portable device in a particular city or geographical region;
   determining, by the one or more computing devices, whether a location requirement associated with the content allows the portable device to receive the content, based on the IP address or MAC address corresponding to the indication of the location of the portable device;
   determining, by the one or more computing devices, whether the portable device is entitled to receive the requested content when the portable device is not located at the customer premises that is associated with the subscription plan or the at least one account option, wherein the determining is based on the indication of the location of the portable device;
   determining, by the one or more computing devices, whether blackout restrictions apply to viewing the requested content, wherein the blackout restrictions are based on at least the subscription plan or the at least one account option, and the indication of the location of the portable device;
   transmitting, to the portable device and by the one or more computing devices, when it is determined that the portable device is entitled to receive the content and that blackout restrictions do not apply, a decryption key corresponding to the content;
   streaming, by the one or more computing devices, an encrypted version of the content to the portable device, for decryption and playback of the content by the portable device, wherein the encrypted version of the content is encrypted using a different encryption key for each of a plurality of sections of the encrypted version of the content; and
   receiving a plurality of requests, from the portable device, for decryption keys, corresponding to respective sections of the encrypted version of the content.

2. The method of claim 1, where the blackout restrictions for the requested content include an indication of one or more geographical locations or regions to which the blackout restrictions apply.

3. The method of claim 2, where the blackout restrictions for the requested content additionally include one or more rules that define accounts to which the blackout restrictions apply.

4. The method of claim 1, further comprising:
   determining that the portable device is not entitled to display the content when the blackout restrictions indicate that a blackout is in effect and the location of the portable device is within an area covered by the blackout restrictions.

5. The method of claim 1, further comprising:
   determining that the portable device is not entitled to receive the content, and
   streaming substitute content to the portable device, in response to the request for content.

6. The method of claim 1, where the blackout restrictions are imposed by or on behalf of an owner of the content.

7. The method of claim 1, where the blackout restrictions include restrictions on video content relating to sporting events.

8. The method of claim 1, where the indication of the location of the portable device includes an indication of whether the portable device is in a geographic location corresponding to a customer premise of an account associated with the portable device.

9. The method of claim 1, further comprising:
   generating a session token to use during authentication of the portable device, the session token being based on:
      an identifier associated with the portable device and an application key associated with a playback application executed by the portable device; and
   authenticating, using the generated token, the portable device.

10. The method of claim 1, where the portable device includes a tablet computer, a smart phone, or a laptop computer.

11. The method of claim 1, where the content includes streaming video corresponding to a television channel.

12. A non-transitory computer-readable medium that stores programming instructions for execution by one or more processors, the computer-readable medium comprising:
   instructions to receive a request for content streamed over an Internet Protocol (IP) network to a portable device, wherein the request includes information identifying the portable device;
   instructions to identify a subscription plan or at least one account option associated with the portable device;

instructions to determine whether a subscription requirement associated with the content allows the portable device to receive content, based on the subscription plan or the at least one account option that is associated with the portable device;

instructions to determine an indication of a location of the portable device based on an IP address or media access control (MAC) address of an access point which the portable device is connected;

instructions to determine, in response to determining that the IP address or MAC address corresponds to an IP or MAC address of a location other than a customer premises, the indication of the location based on whether the IP address or MAC address is allocated to the portable device in a particular city or geographical region;

instructions to determine whether a location requirement associated with the content allows the portable device to receive the content, based on the IP address or MAC address corresponding to the indication of the location of the information identifying the identified portable device;

instructions to determine whether the identified portable device is entitled to receive the requested content when the portable device is not located at the customer premises that is associated with the subscription plan or the at least one account option, wherein the determination is based on the indication of the location of the portable device;

instructions to determine whether blackout restrictions are applicable to viewing the requested content, wherein the blackout restrictions are determined based at least on the subscription plan or the at least one account option, and the indication of the location of the portable device;

instructions to transmit, when it is determined that the portable device is not entitled to receive the content due to a blackout restriction, a decryption key corresponding to substitute content to the portable device;

instructions to transmit, when it is determined that the portable device is entitled to receive the content and no blackout restrictions apply, a decryption key corresponding to the content;

instructions to stream an encrypted version of the content to the portable device, for decryption and playback of the content by the portable device, wherein the encrypted version of the content is encrypted using a different encryption key for each of a plurality of sections of the encrypted version of the content; and instructions to receive a plurality of requests for decryption keys, corresponding to respective sections of the encrypted version of the content.

13. The non-transitory computer-readable medium of claim 12, where the blackout restrictions for the requested content include an indication of one or more geographical locations or regions to which the blackout restrictions apply.

14. The non-transitory computer-readable medium of claim 13, where the blackout restrictions for the requested content additionally include one or more rules that define accounts to which the blackout restrictions apply.

15. The non-transitory computer-readable medium of claim 12, further comprising:
determining that the portable device is not entitled to receive the content when the blackout restrictions indicate that a blackout is in effect and the location of the identified portable device is within an area covered by the blackout restrictions.

16. The non-transitory computer-readable medium of claim 12, further comprising, when it is determined that the device is not entitled to receive the content due to the blackout restriction:
instructions to stream the substitute content to the portable device.

17. The non-transitory computer-readable medium of claim 12, where the content includes a television channel.

18. The non-transitory computer-readable medium of claim 12, where the indication of the location of the portable device includes an indication of whether the portable device is in a geographic location corresponding to customer premises of an account associated with the portable device.

19. A system, comprising:
a content server configured to:
store encrypted video content that is to be transmitted, as an encrypted video stream, to a portable device associated with a subscriber to television content, wherein the encrypted video content is encrypted using a different encryption key for each of a plurality of sections of the encrypted video content, and
receive a plurality of requests, from the portable device, for decryption keys, corresponding to respective sections of the encrypted video content;
an entitlement server to store keys needed to decrypt the encrypted video content, the entitlement server determining entitlements, relating to television channels which the portable device is eligible to receive, based on an indication of the location of the portable device, wherein the indication is based on an Internet Protocol (IP) address or media access control (MAC) address of an access point, and based on blackout restrictions applicable to the video content for a subscription type associated with the subscriber,
wherein the entitlement server determines, in response to determining that the IP address or MAC address corresponds to an IP address or MAC address of a location other than a customer premises, the indication of the location based on whether the IP address or MAC address is allocated to portable devices in a particular city or geographical region,
wherein the entitlement server determines that the portable device is not entitled to receive the video content when the blackout restrictions indicate that a blackout is in effect and the location of the portable device is within an area covered by the blackout restrictions, and the subscription type indicates that the portable device is not entitled to receive the video content based on account information corresponding to the portable device,
wherein the entitlement server is additionally configured to transmit, to the portable device, a plurality of decryption keys for the encrypted video stream, in response to the plurality of request when the determined entitlements indicate that the portable device is entitled to receive the video content; and
a content aggregator to receive broadcast television content and to provide the broadcast television content, as the encrypted video stream, to the content server.

20. The system of claim 19, where the blackout restrictions for the video content include an indication of one or more geographic locations or regions to which the blackout restrictions apply.

21. The system of claim 19, where the blackout restrictions for the video content additionally include one or more rules that define accounts to which the blackout restrictions apply.

* * * * *